United States Patent [19]

Ngai et al.

[11] Patent Number: 5,650,823

[45] Date of Patent: Jul. 22, 1997

[54] HALF PEL MOTION ESTIMATION METHOD FOR B PICTURES

[75] Inventors: Agnes Yee Ngai, Endwell; Ronald Steven Svec, Berkshire, both of N.Y.

[73] Assignee: International Business Machines Corporation, Armonk, N.Y.

[21] Appl. No.: 411,100

[22] Filed: Mar. 27, 1995

[51] Int. Cl.$^6$ ................................................ H04N 7/32
[52] U.S. Cl. .......................... 348/415; 348/401; 348/402; 348/409; 348/467
[58] Field of Search ...................... 348/415, 394, 348/402, 409, 416, 714, 715, 716, 717, 718, 719

[56] References Cited

U.S. PATENT DOCUMENTS

| | | | |
|---|---|---|---|
| 4,958,226 | 9/1990 | Haskell et al. | 358/136 |
| 5,278,647 | 1/1994 | Hingorani et al. | 358/136 |
| 5,311,305 | 5/1994 | Mahadevan et al. | 348/169 |
| 5,311,307 | 5/1994 | Yoshimoto | 348/384 |
| 5,321,508 | 6/1994 | Veltman et al. | 348/439 |
| 5,351,095 | 9/1994 | Kerdranvat | 348/699 |
| 5,379,351 | 1/1995 | Fandrianto et al. | 382/41 |
| 5,386,234 | 1/1995 | Veltman et al. | 348/409 |
| 5,414,469 | 5/1995 | Gonzales et al. | 348/408 |
| 5,526,054 | 6/1996 | Greenfield et al. | 348/467 |
| 5,528,315 | 6/1996 | Sugiyama | 348/714 |
| 5,539,466 | 7/1996 | Igarashi et al. | 348/401 |
| 5,539,467 | 7/1996 | Song et al. | 348/402 |

*Primary Examiner*—Howard W. Britton
*Assistant Examiner*—Frank Snow
*Attorney, Agent, or Firm*—Richard M. Goldman

[57] ABSTRACT

Disclosed is a method of forming a bidirectionally coded picture, i.e., a B frame, from two reference pictures, e.g. I or P frame pictures. The method utilizes a single memory fetch of each reference picture, and interpolation of the estimated motion of each picture. This is accomplished by identifying a full pixel closest match from three full pixel boundary searches, calculating half pixel reference picture data therefrom, interpolating the half pixels to form bidirectionally coded pictures, and finding the closest match at the half pixel boundary. The intermediate results are stored in an 18×18×11 bit buffer holding a 7 bit partial sum for each pixel, said partial sum formed by adding the six most significant bits of corresponding I and P frame pixels. In this buffer four bits of each word in the buffer are the two Least Significant Bits of the corresponding I and P frame pixels.

2 Claims, 5 Drawing Sheets

FIG.3 FIGURE 3 – BLOCK DIAGRAM OF THE DPDVP

HALF PEL MOTION ESTIMATION METHOD FOR B PICTURES

FIELD OF THE INVENTION

This invention relates to video encoders, especially video encoders intended to encode and compress video signals, e.g., discrete cosine transform encoded video signals. The method, apparatus, and system of the invention are useful in encoding broadcast signals, cablecast signals, and digital network signals, as well as in high definition television, interactive television, multimedia, video on demand, video conferencing, and digital video recording.

BACKGROUND OF THE INVENTION

The Moving Picture Experts' Group (MPEG) MPEG-2 Draft Standard is a compression/decompression standard for digital video applications. The standard describes an encoding result demonstrates a substantial bandwidth reduction by a subjective lossy compression followed by a lossless compression. The encoded, compressed digital video data is subsequently decompressed and decoded in an MPEG-2 Draft Standard compliant decoder.

The MPEG-2 Draft Standard is described in, e.g., C. A. Gonzales and E. Viscito, "Motion Video Adaptive Quantization In The Transform Domain," *IEEE Trans Circuits Syst Video Technol*, Volume 1, No. 4, December 1991, pp. 374–378, E. Viscito and C. A. Gonzales, "Encoding of Motion Video Sequences for the MPEG Environment Using Arithmetic Coding," *SPIE*, Vol. 1360, pp. 1572–1576, (1990), D. LeGall, "MPEG: A Video Compression Standard for Multimedia Applications," *Communications of the ACM*, Vol. 34, No. 4, (April 1991), pp. 46–58, S. Purcell and D. Galbi, "C Cube MPEG Video Processor," *SPIE*, v. 1659, (1992) pp. 24–29, and D. J. LeGall, "MPEG Video Compression Algorithm," *Signal Process Image Commun*, v. 4, n. 2, (1992), pp. 129–140, among others.

The MPEG-2 Draft Standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 Draft Standard result in a balance between intraframe encoding alone and interframe encoding alone.

The MPEG-2 Draft Standard exploits temporal redundancy for motion compensated interpolative and predictive encoding. That is, the assumption is made that "locally" the current picture can be modelled as a translation of the picture at a previous and/or future time. "Locally" means that the amplitude and direction of the displacement are not the same everywhere in the picture.

MPEG-2 Draft Standard specifies predictive and interpolative interframe encoding and frequency domain intraframe encoding. It has block based motion compensation for the reduction of temporal redundancy, and Discrete Cosine Transform based compression for the reduction of spatial redundancy. Under MPEG-2 Draft Standard motion compensation is achieved by predictive coding, interpolative coding, and Variable Length Coded motion vectors. The information relative to motion is based on 16×16 blocks and is transmitted with the spatial information. It is compressed with Variable Length Codes, such as Huffman codes.

The MPEG-2 Draft Standard provides temporal redundancy reduction through the use of various predictive and interpolative tools. This is illustrated in FIG. 1. FIG. 1 shows three types of frames or pictures, "I" Intrapictures, "P" Predicted Pictures, and "B" Bidirectional Interpolated Pictures.

The "I" Intrapictures provide moderate compression, and are access points for random access, e.g., in the case of video tapes or CD ROMS. As a matter of convenience, one "I" Intrapicture is provided approximately every half second. The "I" Intrapicture only gets information from itself. It does not receive information from an "P" Predicted Picture or "B" Bidirectional Interpolated Picture. Scene cuts preferably occur at "I" Intrapictures.

"P" Predicted Pictures are coded with respect to a previous picture. "P" Predicted Pictures are used as the reference for future pictures, both "P" and "B" pictures.

"B" Bidirectional Coded pictures have the highest degree of compression. They require both a past picture and a future picture for reconstruction. "B" bidirectional pictures are never used as a reference.

Motion compensation goes to the redundancy between pictures. The formation of "P" Predicted Pictures from "I" Intrapictures and of "B" Bidirectional Coded Pictures from a pair of past and future pictures is a key feature of the MPEG-2 Draft Standard technique.

The motion compensation unit under the MPEG-2 Draft Standard is the Macroblock unit. The MPEG-2 Draft Standard Macroblocks are 16×16 pixel macroblocks. Motion information consists of one vector for forward predicted macroblocks, one vector for backward predicted macroblocks, and two vectors for bidirectionally predicted macroblocks. The motion information associated with each 16×16 macroblock is coded differentially with respect to the motion information present in the reference macroblock. In this way a 16×16 macroblock of pixels is predicted by a translation of a 16×16 macroblock of pixels from a past or future picture.

The difference between the source pixels and the predicted pixels is included in the corresponding bit stream. The decoder adds the correction term to the block of predicted pixels to produce the reconstructed block.

As described above and illustrated in FIG. 1, each 16×16 pixel block of a "P" Predicted Picture can be coded with respect to the closest previous "I" Intrapicture, or with respect to the closest previous "P" Predicted Picture.

Further, as described above and illustrated in FIG. 1, each 16×16 pixel block of a "B" Bidirectional Picture can be coded by forward prediction from the closest past "I" or "P" Picture, by backward prediction from the closest future "I" or "P" Picture, or bidirectionally, using both the closest past "I" or "P" picture and the closest "future "I" or "P" picture. Full bidirectional prediction is the least noisy prediction.

Motion information is sent with each 16×16 pixel block to show what part of the reference picture is to be used as a predictor.

As noted above, motion vectors are coded differentially with respect to motion vectors of the previous adjacent block. Variable Length Coding is used to code the differential motion vector so that only a small number of bits are needed to code the motion vector in the common case, where the motion vector for a block is nearly equal to the motion vector for a preceding block.

Spatial redundancy is the redundancy within a picture. Because of the block based nature of the motion compensation process, described above, it was desirable for the MPEG-2 Draft Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After transformation, many of the frequency coefficients are zero, especially the coefficients for high spatial frequencies. These coefficients are organized into a zig-zag, as shown in FIG. 2, and converted into run-amplitude (run-level) pairs. Each pair indicates the number of zero coefficients and the amplitude of the non-zero coefficient. This is coded in a Variable Length Code.

Discrete Cosine Transformation encoding is carried out in the three stages as shown in FIG. 2. The first stage is the computation of the Discrete Cosine Transformation coefficients. The second step is the quantization of the coefficients. The third step is the conversion of the quantized transform coefficients into {run-amplitude} pairs after reorganization of the data into zig-zag scanning order.

Quantization enables very high degrees of compression, and a high output bit rate, and retains high picture quality.

Quantization can be adaptive, with "I" Intrapictures having fine quantization to avoid "blocking." This is important because "I" Intrapictures contain energy at all frequencies. By way of contrast, "P" and "B" pictures contain predominantly high frequency energy and can be coded at a coarser quantization.

The MPEG-2 Draft Standard specifies a layered structure of syntax and bit stream. The bit stream is separated into logically distinct entities to prevent ambiguities and facilitate decoding. The six layers are shown in Table 1, below

TABLE 1

| MPEG-2 Draft Standard Layers | |
|---|---|
| Layer | Purpose |
| Sequence Layer | Random Access Unit and Context |
| Group of Pictures Layer | Random Access Unit and Video Coding |
| Picture Layer | Primary Coding Unit |
| Slice Layer | Resynchronization Unit |
| Macroblock Layer | Motion Compensation Unit |
| Block Layer | DCT Unit |

OBJECTS OF THE INVENTION

It is a primary object of the invention to provide a reduced requirement for memory bandwidth in bidirectionally coding pictures.

It is a further object of the invention to reduce the memory required for bidirectionally coded pictures.

SUMMARY OF THE INVENTION

These and other objects are accomplished by a method of forming a bidirectionally coded picture, i.e., a B frame, from two reference pictures, e.g. I or P frame pictures. The method utilizes a single memory fetch of each reference picture, and interpolation of the estimated motion of each picture. This is accomplished by identifying a full pixel closest match from three full pixel boundary searches, calculating half pixel reference picture data therefrom, interpolating the half pixels to form bidirectionally coded pictures, and finding the closest match at the half pixel boundary. The intermediate results are stored in an 18×18×11 bit buffer holding a 7 bit partial sum for each pixel, said partial sum formed by adding the six most significant bits of corresponding I and P frame pixels. In this buffer four bits of each word in the buffer are the two Least Significant Bits of the corresponding I and P frame pixels.

BRIEF DESCRIPTION OF THE FIGURES

The invention may be understood by reference to the FIGURES appended hereto.

DETAILED DESCRIPTION OF THE INVENTION

As defined in the MPEG standard, video images can be compressed as one of three picture types: I, P or B. An I picture is compressed by removal of spatial redundancy within the picture itself. A P picture is compressed by removal of temporal redundancy with reference to a previously encoded (compressed) picture. A B picture is also compressed by removal of temporal redundancy, but with reference to two previously encoded pictures. The B picture can be compressed by interpolation of both reference pictures. This enables B pictures to achieve the highest compression among the three picture types.

Bidirectional interpolation in a B picture is defined as follows:

let x be a pixel from reference picture I and let y be a pixel from reference picture P.

The bidirectionally interpolated reference pixel is $$(x+y)/2$$

where / is division with rounding.

A pixel is defined as an 8 bit wide positive integer in the range of 0 to 255. Thus, rounding implies that if the most significant bit of the residue is 1 then a 1 is added to the least significant bit of the quotient. Only the quotient is kept as the result of division and the residue is discarded. This is easily implemented in hardware as a right shift followed by an increment.

In motion picture encoding, the temporal redundancy must be identified so that it can be removed. This is accomplished by a process called motion estimation. Comparison circuitry is used to find a closest match for the current picture within a search window. Thus one would require three motion estimations to find a closest match for a B picture: one motion estimation with each of the two reference pictures and one motion estimation with the interpolated reference.

Per the MPEG standard, motion estimation is performed on a macroblock. The video image is divided into units of 16×16 pixels called a macroblock. For this reason the size of the closest match macroblock must also be 16×16 pixels. An 18×18 pixel area is required to form all possible half pixels around the identified closest match (16×16) macroblock. The types of half pixels used in motion estimation are explained later.

Motion estimation of a B picture involves memory fetches. A picture (720×480 pixels) requires 346K bytes of luminance data and is typically stored in memory external to the ASIC.

One method, utilized in the prior art, is to fetch one reference picture from external memory and to perform motion estimation with it. Then the second reference picture is fetched and motion estimation is performed in the same manner as the first reference picture. Then the closest match reference data (18×18 pixel block) from the first and second reference picture are fetched again and the motion estimation is performed on the interpolated picture.

Figure 5:
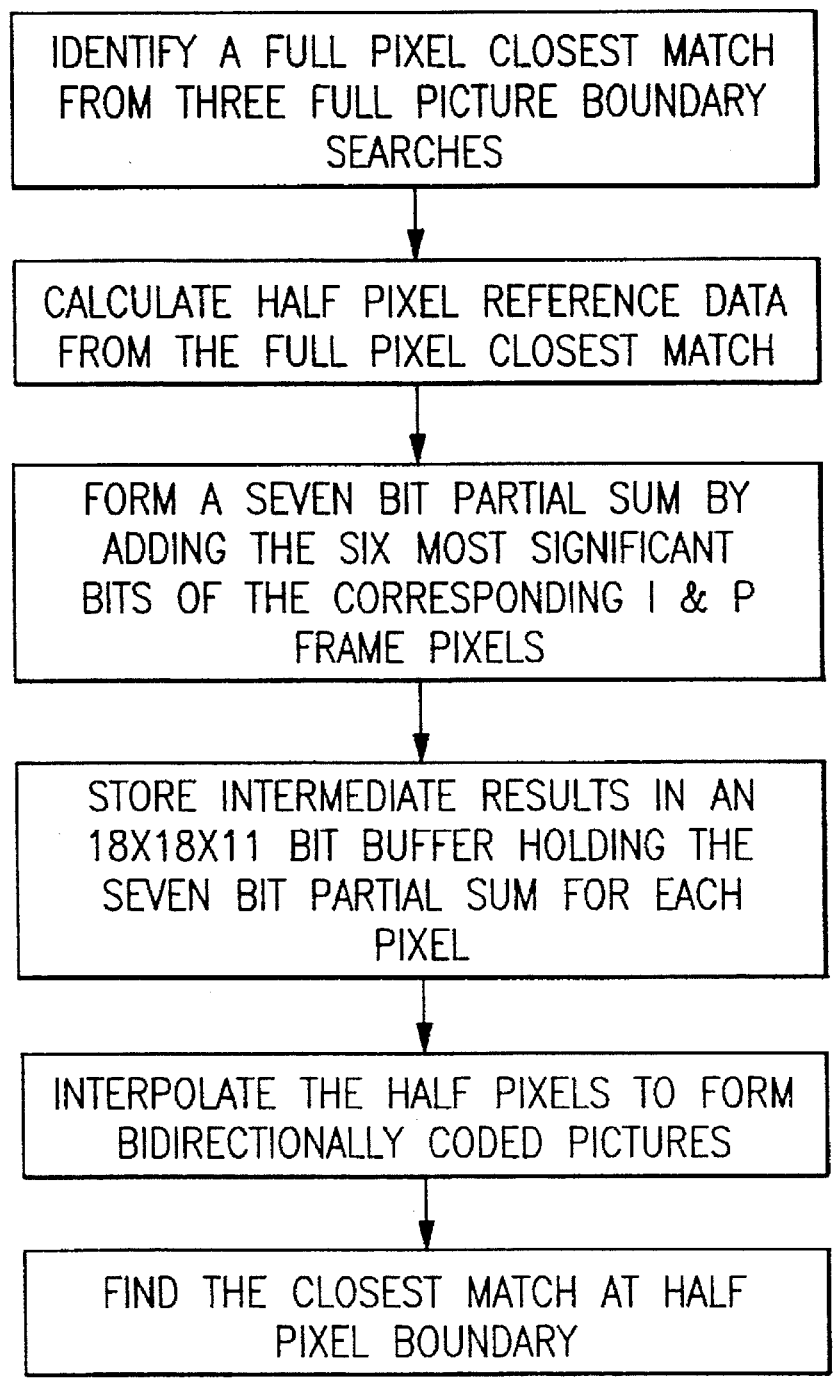
FIG. 5 shows a flow chart of the method of the invention.

The method of our invention is to fetch each reference picture only once as shown in the flow chart of FIG. 5. The closest match reference data from each reference picture is saved in an on-chip buffer. Subsequently, an interpolated motion estimation is performed using this buffered data. This method reduces the memory bandwidth requirement over the method of the prior art.

Once a closest match is identified from these three full pel boundary searches, half pixel reference data must be calculated and the motion estimation performed again to find the closest match reference data at the half pel boundary. There are three types of half pel interpolation used to calculate the half pixel reference data: horizontal half, vertical half and full half.

Let a, b, c and d be the four adjacent pixels in a reference picture as follows:

a b c d

Figure 4:
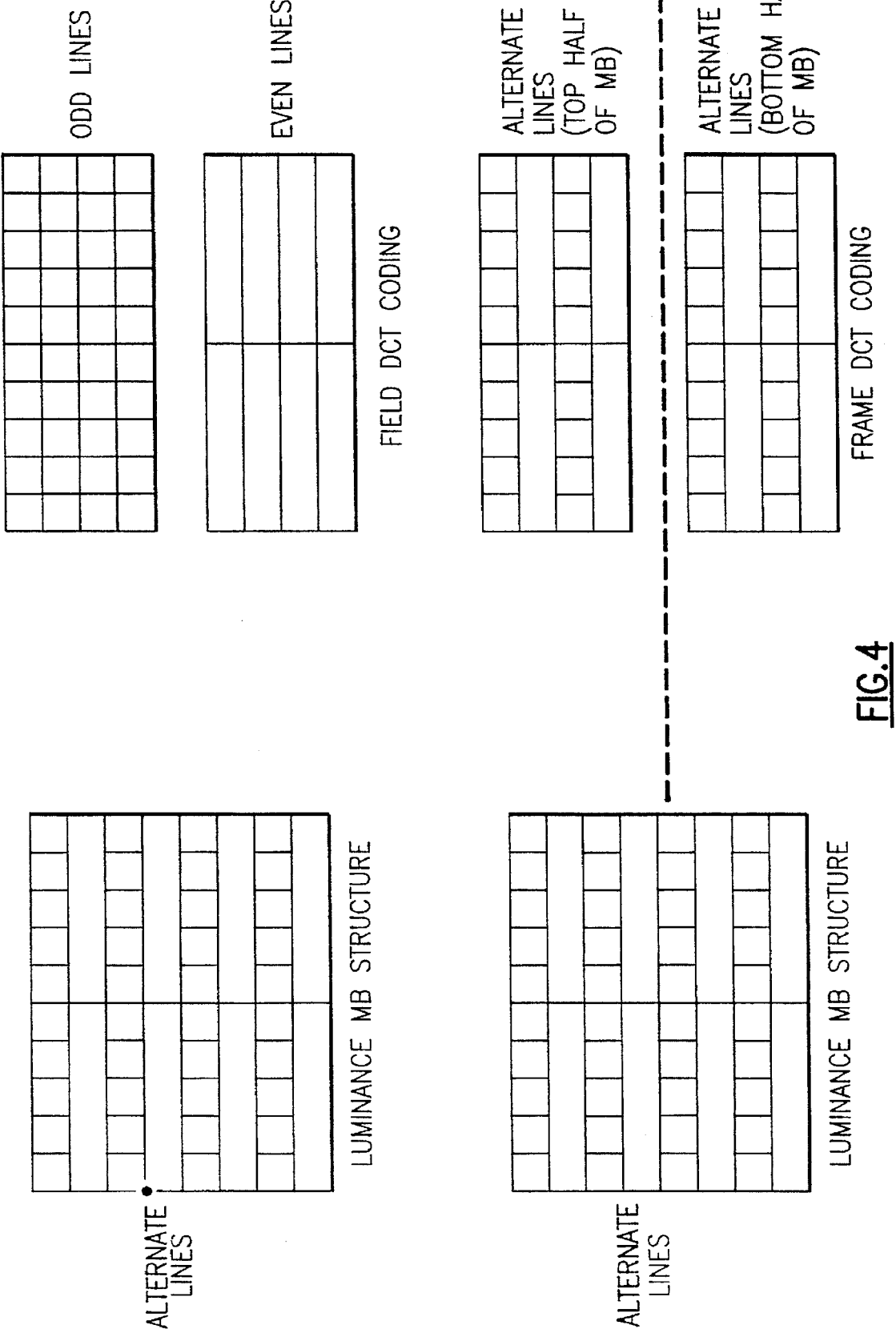
FIG. 4 shows a circuit for calculating full half pixels in B Bidirectionally Interpolated pictures according to the partial sum method of the invention.

The horizontal half pixels are formed by:

$(a+b)/2$ $(c+d)/2$ where / is division with rounding. Vertical half pixels are formed by:

$(a+c)/2$ $(b+d)/2$ where / is division with rounding. This is illustrated in FIG. 4. Full half pixels are formed by:

$(a+b+c+d)/4$ where / is division with rounding.

Half pixels must first be formed from the buffered data for each reference picture. Then the interpolated half pixels for B pictures can be formed from these results to complete the motion estimation. Because of rounding, the order of operation must be maintained to correctly produce the interpolated result. In the prior art, this requires 2 sets of 18×18×8 bit buffers for a B picture, one for each reference picture.

According to the method the invention described herein the buffer requirement can be reduced to a single 18×18×11 bit buffer, as shown in the flow chart of FIG. 5. This buffer holds a 7-bit partial sum for each pixel, formed by adding the 6 most significant bits of corresponding I and P picture pixels. The other 4 bits of each word in the buffer consist of the 2 least significant bits of the corresponding I and P pixels.

As mentioned before, half pel motion estimation of a B picture requires half pel interpolation on each reference picture followed by interpolating those half pel results across the two reference pictures.

The following pictures are used with respect to the I frame. Let the following denote the pixels in the reference I picture:

$I_{00}(x)I_{01}(x)$ $I_{10}(x)I_{11}(x)$ where x denotes the bit position of each pixel and is an integer between 1 and 8.

The equation for horizontal half pel is $I_{HH}=(I_{00}(1)I_{00}(2) \ldots I_{00}(7)I_{00}(8)+I_{01}(1)I_{01}(2) \ldots I_{01}(7)I_{01}(8))/2$ Considering only the two least significant bits of the pixel pair yields the following:

$$\begin{array}{r} I_{00}(7)\ I_{00}(8) \\ +\ I_{01}(7)\ I_{01}(8) \\ \hline I_{C0x}(6)\ I_{S0x}(7)\ I_{S0x}(8) \end{array}$$

Note that $I_{S0x}(8)$ is the 'round' term for this half pel calculation since we perform division by 2. With this in mind the horizontal half pel equation for the I picture can be modified to:

$$\begin{array}{r} I_{00}(1)\ I_{00}(2)\ I_{00}(3)\ I_{00}(4)\ I_{00}(5)\ I_{00}(6)\ \text{'0'} \\ I_{01}(1)\ I_{01}(2)\ I_{01}(3)\ I_{01}(4)\ I_{01}(5)\ I_{01}(6)\ \text{'0'} \\ I_{C0x}(6)\ I_{S0x}(7) \\ +\ \ \ \ \ \ \ \ \ \ \ \ \ \ \ \ \ \ \ \ \ \ \ \ \ \ \ \ \ \ \ \ \ \ \ \ \ \ I_{S0x}(8) \\ \hline I_{HH} \end{array}$$

With similar deduction, the vertical half pel equation for the I picture can be written as:

$$\begin{array}{r} I_{00}(1)\ I_{00}(2)\ I_{00}(3)\ I_{00}(4)\ I_{00}(5)\ I_{00}(6)\ \text{'0'} \\ I_{10}(1)\ I_{10}(2)\ I_{10}(3)\ I_{10}(4)\ I_{10}(5)\ I_{10}(6)\ \text{'0'} \\ I_{C0x}(6)\ I_{S0x}(7) \\ +\ \ \ \ \ \ \ \ \ \ \ \ \ \ \ \ \ \ \ \ \ \ \ \ \ \ \ \ \ \ \ \ \ \ \ \ \ \ I_{S0x}(8) \\ \hline I_{VH} \end{array}$$

where $I_{Cx0}(6)$, $I_{Sx0}(7)$, and $I_{Sx0}(8)$ are obtained as follows:

$$\begin{array}{r} I_{00}(7)\ I_{00}(8) \\ +\ I_{10}(7)\ I_{10}(8) \\ \hline I_{Cx0}(6)\ I_{Sx0}(7)\ I_{Sx0}(8) \end{array}$$

Again, note that $I_{Sx0}(8)$ is the 'round' term for this calculation since the division is by 2.

With similar deduction, the full half pel equation can be written as:

$$\frac{\begin{array}{l}I_{00}(1)\ I_{00}(2)\ I_{00}(3)\ I_{00}(4)\ I_{00}(5)\ I_{00}(6)\}\\ I_{01}(1)\ I_{01}(2)\ I_{01}(3)\ I_{01}(4)\ I_{01}(5)\ I_{01}(6)\}\\ I_{10}(1)\ I_{10}(2)\ I_{10}(3)\ I_{10}(4)\ I_{10}(5)\ I_{10}(6)\}\\ I_{11}(1)\ I_{11}(2)\ I_{11}(3)\ I_{11}(4)\ I_{11}(5)\ I_{11}(6)\}\\ \phantom{I_{11}(1)\ I_{11}(2)\ I_{11}(3)\ I_{11}(4)\ }I_C(5)\ I_C(6)\\ +\phantom{I_{11}(1)\ I_{11}(2)\ I_{11}(3)\ I_{11}(4)\ I_C(5)\ }I_S(7)\end{array}}{I_{FH}}$$

where $I_C(5)$, $I_C(6)$, and $I_S(7)$ are obtained from the following equation:

$$\frac{\begin{array}{l}I_{00}(7)\ I_{00}(8)\\ I_{01}(7)\ I_{01}(8)\\ I_{10}(7)\ I_{10}(8)\\ +\ I_{11}(7)\ I_{11}(8)\end{array}}{I_C(5)\ I_C(6)\ I_S(7)\ I_S(8)}$$

Note that for this calculation, the 'round' term is $I_S(7)$ since we divide by 4 and that $I_S(8)$ is discarded.

Half pixel calculations for the P picture can be handled in the same manner. Let the following denote the pixels in the reference P picture:

$$P_{00}(x) P_{01}(x)$$

$$P_{01}(x) P_{11}(x)$$

where x denotes the bit position of each pixel and is an integer between 1 and 8.

With the same method as in the I picture, the equation for horizontal half interpolation in the P picture could be written as follows:

$$\frac{\begin{array}{l}P_{00}(1)\ P_{00}(2)\ P_{00}(3)\ P_{00}(4)\ P_{00}(5)\ P_{00}(6)\ \text{'0'}\\ P_{01}(1)\ P_{01}(2)\ P_{01}(3)\ P_{01}(4)\ P_{01}(5)\ P_{01}(6)\ \text{'0'}\\ \phantom{P_{01}(1)\ P_{01}(2)\ P_{01}(3)\ P_{01}(4)\ }P_{C0x}(6)\ P_{S0x}(7)\\ +\phantom{P_{01}(1)\ P_{01}(2)\ P_{01}(3)\ P_{01}(4)\ P_{C0x}(6)\ }P_{S0x}(8)\end{array}}{P_{HH}}$$

where $P_{C0x}(6)$, $P_{S0x}(7)$, and $P_{S0x}(8)$ are obtained from:

$$\frac{\begin{array}{l}P_{00}(7)\ P_{00}(8)\\ +\ P_{01}(7)\ P_{01}(8)\end{array}}{P_{C0x}(6)\ P_{S0x}(7)\ P_{S0x}(8)}$$

The equation for vertical half interpolation in the P picture can be written as follows:

$$\frac{\begin{array}{l}P_{00}(1)\ P_{00}(2)\ P_{00}(3)\ P_{00}(4)\ P_{00}(5)\ P_{00}(6)\ \text{'0'}\\ P_{10}(1)\ P_{10}(2)\ P_{10}(3)\ P_{10}(4)\ P_{10}(5)\ P_{10}(6)\ \text{'0'}\\ \phantom{P_{10}(1)\ P_{10}(2)\ P_{10}(3)\ P_{10}(4)\ }P_{Cx0}(6)\ P_{Sx0}(7)\\ +\phantom{P_{10}(1)\ P_{10}(2)\ P_{10}(3)\ P_{10}(4)\ P_{Cx0}(6)\ }P_{Sx0}(8)\end{array}}{P_{VH}}$$

where $P_{Cx0}(6)$, $P_{Sx0}(7)$, and $P_{Sx0}(8)$ are obtained from:

$$\frac{\begin{array}{l}P_{00}(7)\ P_{00}(8)\\ +\ P_{10}(7)\ P_{10}(8)\end{array}}{P_{Cx0}(6)\ P_{Sx0}(7)\ P_{Sx0}(8)}$$

And finally, the equation for full half interpolation in the P picture could be written as follows:

$$\frac{\begin{array}{l}P_{00}(1)\ P_{00}(2)\ P_{00}(3)\ P_{00}(4)\ P_{00}(5)\ P_{00}(6)\\ P_{01}(1)\ P_{01}(2)\ P_{01}(3)\ P_{01}(4)\ P_{01}(5)\ P_{01}(6)\\ P_{10}(1)\ P_{10}(2)\ P_{10}(3)\ P_{10}(4)\ P_{10}(5)\ P_{10}(6)\\ P_{11}(1)\ P_{11}(2)\ P_{11}(3)\ P_{11}(4)\ P_{11}(5)\ P_{11}(6)\\ \phantom{P_{11}(1)\ P_{11}(2)\ P_{11}(3)\ P_{11}(4)\ }P_C(5)\ P_C(6)\\ +\phantom{P_{11}(1)\ P_{11}(2)\ P_{11}(3)\ P_{11}(4)\ P_C(5)\ }P_S(7)\end{array}}{P_{FH}}$$

where $P_C(5)$ $P_C(6)$ and $P_S(7)$ are obtained from the following equation:

$$\frac{\begin{array}{l}P_{00}(7)\ P_{00}(8)\\ P_{01}(7)\ P_{01}(8)\\ P_{10}(7)\ P_{10}(8)\\ +\ P_{11}(7)\ P_{11}(8)\end{array}}{P_C(5)\ P_C(6)\ P_S(7)\ P_S(8)}$$

Bidirectionally interpolated horizontal half pixels in the B picture are formed by the interpolation of the horizontal half pixels from the I and P reference pictures. As such, the equations for $I_{HH}$ and $P_{HH}$ can be combined with the equation for bidirectional interpolation. This yields the following equation for an interpolated horizontal half pixel:

$$\frac{\begin{array}{l}I_{00}(1)\ I_{00}(2)\ I_{00}(3)\ I_{00}(4)\ I_{00}(5)\ I_{00}(6)\\ I_{01}(1)\ I_{01}(2)\ I_{01}(3)\ I_{01}(4)\ I_{01}(5)\ I_{01}(6)\\ P_{00}(1)\ P_{00}(2)\ P_{00}(3)\ P_{00}(4)\ P_{00}(5)\ P_{00}(6)\\ P_{01}(1)\ P_{01}(2)\ P_{01}(3)\ P_{01}(4)\ P_{01}(5)\ P_{01}(6)\\ \phantom{P_{01}(1)\ P_{01}(2)\ P_{01}(3)\ }IP_{C0x}(4)\ IP_{C0x}(5)\ IP_{C0x}(6)\\ +\phantom{P_{01}(1)\ P_{01}(2)\ P_{01}(3)\ IP_{C0x}(4)\ IP_{C0x}(5)\ }IP_{S0x}(7)\end{array}}{HH}$$

where $IP_{C0x}(4)$, $IP_{C0x}(5)$, $IP_{C0x}(6)$, and $IP_{S0x}(7)$ are formed as follows:

$$\frac{\begin{array}{l}I_{C0x}(6)\phantom{xx}I_{S0x}(7)\\ \phantom{I_{C0x}(6)xx}I_{S0x}(8)\\ P_{C0x}(6)\phantom{xx}P_{S0x}(7)\\ +\phantom{I_{C0x}(6)xx}P_{S0x}(8)\end{array}}{IP_{C0x}(4)\ IP_{C0x}(5)\ IP_{C0x}(6)\ IP_{S0x}(7)}$$

and $I_{C0x}(6)$, $I_{S0x}(7)$, $I_{S0x}(8)$, $P_{C0x}(6)$, $P_{S0x}(7)$, and $P_{S0x}(8)$ are as previously defined in the horizontal half pel equations for I and P pictures respectively.

The HH equation can then be rearranged as follows:

$$\frac{\begin{array}{l}IP_{00}(0)\ IP_{00}(1)\ IP_{00}(2)\ IP_{00}(3)\ IP_{00}(4)\ IP_{00}(5)\ IP_{00}(6)\\ IP_{01}(0)\ IP_{01}(1)\ IP_{01}(2)\ IP_{01}(3)\ IP_{01}(4)\ IP_{01}(5)\ IP_{01}(6)\\ \phantom{IP_{01}(0)\ IP_{01}(1)\ IP_{01}(2)\ IP_{01}(3)\ }IP_{C0x}(4)\ IP_{C0x}(5)\ IP_{C0x}(6)\\ +\phantom{IP_{01}(0)\ IP_{01}(1)\ IP_{01}(2)\ IP_{01}(3)\ IP_{C0x}(4)\ IP_{C0x}(5)\ }IP_{S0x}(7)\end{array}}{HH}$$

where $IP_{00}n$ denotes the partial sum formed from $I_{00}(n)$ and $P_{00}(n)$ where $IP_{01}n$ denotes the partial sum formed from $I_{01}(n)$ and $P_{01}(n)$ with 'n' denoting the bit position in the pixel byte and is in the range of 0 through 6 only.

Also note that:

$IP_{00}(0)$ is the carry out of $I_{00}(1:6)+P_{00}(1:6)$
$IP_{01}(0)$ is the carry out of $I_{01}(1:6)+P_{01}(1:6)$ Thus, the interpolated horizontal half pixel results can be calculated with partial sums ($IP_{00}(n)$ and $IP_{01}(n)$) from the I and P reference pictures in combination with the two least significant bits of each pixel from the I and P reference pictures.

The same rearrangement can also be done on the VH and FH equations. Thus the VH becomes:

$$\frac{\begin{array}{l}IP_{00}(0)\,IP_{00}(1)\,IP_{00}(2)\,IP_{00}(3)\,IP_{00}(4)\,IP_{00}(5)\,IP_{00}(6)\\ IP_{10}(0)\,IP_{10}(1)\,IP_{10}(2)\,IP_{10}(3)\,IP_{10}(4)\,IP_{10}(5)\,IP_{10}(6)\\ \qquad\qquad\qquad IP_{Cx0}(4)\,IP_{Cx0}(5)\,IP_{Cx0}(6)\\ +\qquad\qquad\qquad\qquad\qquad\qquad IP_{Sx0}(7)\end{array}}{VH}$$

where $IP_{00}(n)$ denotes the partial sum formed from $I_{00}(n)$ and $P_{00}(n)$ where $IP_{01}(n)$ denotes the partial sum formed from $I_{10}(n)$ and $P_{01}(n)$ with 'n' denoting the bit position in the pixel byte and in the range of 0 through 6 only.

Again, note that:

$IP_{00}(0)$ is the carry out of $I_{00}(1:6)+P_{00}(1:6)$ $IP_{01}(0)$ is the carry out of $I_{10}(1:6)+P_{10}(1:6)$ and $IP_{Cx0}(4)$ $IP_{Cx0}(5)$ $IP_{Cx0}(6)$ and $IP_{Sx0}(7)$ are formed as follows:

$$\frac{\begin{array}{l}I_{Cx0}(6)\quad I_{Sx0}(7)\\ \qquad\qquad I_{Sx0}(8)\\ P_{Cx0}(6)\quad P_{Sx0}(7)\\ +\qquad\quad P_{Sx0}(8)\end{array}}{IP_{Cx0}(4)\,IP_{Cx0}(5)\,IP_{Cx0}(6)\,IP_{Sx0}(7)}$$

where $I_{Cx0}(6)$, $I_{Sx0}(7)$, $I_{Sx0}(8)$, $P_{Cx0}(6)$, $P_{Sx0}(7)$, and $P_{Sx0}(8)$ are as previously defined.

With the similar deduction the FH equation becomes:

$$\frac{\begin{array}{l}IP_{00}(0)\,IP_{00}(1)\,IP_{00}(2)\,IP_{00}(3)\,IP_{00}(4)\,IP_{00}(5)\,IP_{00}(6)\\ IP_{01}(0)\,IP_{01}(1)\,IP_{01}(2)\,IP_{01}(3)\,IP_{01}(4)\,IP_{01}(5)\,IP_{01}(6)\\ IP_{10}(0)\,IP_{10}(1)\,IP_{10}(2)\,IP_{10}(3)\,IP_{10}(4)\,IP_{10}(5)\,IP_{10}(6)\\ IP_{11}(0)\,IP_{11}(1)\,IP_{11}(2)\,IP_{11}(3)\,IP_{11}(4)\,IP_{11}(5)\,IP_{11}(6)\\ \qquad\qquad\qquad\qquad\quad IP_C(3)\,IP_C(4)\,IP_C(5)\\ +\qquad\qquad\qquad\qquad\qquad\qquad\qquad IP_C(6)\end{array}}{FH}$$

where $IP_{00}(n)$ denotes the partial sum formed from $I_{00}(n)$ and $P_{00}(n)$, where $IP_{01}(n)$ denotes the partial sum formed from $I_{01}(n)$ and $P_{01}(n)$, where $IP_{01}(n)$ denotes the partial sum formed from $I_{10}(n)$ and $P_{10}(n)$, where $IP_{11}(n)$ denotes the partial sum formed from $I_{11}(n)$ and $P_{11}(n)$, and n denotes the bit position in the pixel byte and is in the range of 0 through 6 only.

$IP_{00}(0)$ is the carry out of $I_{00}(1:6)+P_{00}(1:6)$. $IP_{01}(0)$ is the carry out of $I_{01}(1:6)+P_{01}(1:6)$. $IP_{01}(0)$ is the carry out of $I_{10}(1:6)+P_{01}(1:6)$ and $IP_{11}(0)$ is the carry out of $I_{11}(1:6)+P_{11}(1:6)$.

$IP_C(3)$, $IP_C(4)$, $IP_C(5)$, and $IP_C(6)$ in the previous equation are formed by the following:

$$\frac{\begin{array}{l}IP_{00}(6)\\ IP_{01}(6)\\ IP_{10}(6)\\ IP_{11}(6)\\ I_C(5)\quad I_C(6)\\ \qquad\quad I_S(7)\\ P_C(5)\quad P_C(6)\\ +\qquad\quad P_S(7)\end{array}}{IP_C(3)\,IP_C(4)\,IP_C(5)\,IP_C(6)}$$

with $I_C(5)$, $I_C(6)$, $I_S(7)$, $P_C(5)$, $P_C(6)$, and $P_S(7)$ as previously defined.

Also note that for this case the least significant bit of each partial sum ($IP_{00}(6)$, $IP_{01}(6)$, $IP_{10}(6)$, and $IP_{11}(6)$) must be accounted for in the above equation.

The above equations clearly show that the half pixels required for B picture motion estimation can be formed by interpolation of the pixels in the corresponding byte positions of the two reference pictures first and then calculating the half pixel values from those interpolated pixels.

The above equations clearly show that the half pixels required for B picture motion estimation can be formed from a 'reduced' set of data rather than the two full 18×18 pixel blocks normally required. This reduced set of data consists of an 18×18×11 array of 7-bit partial sums formed from the 6 high-order bits of corresponding pixels in the I and P pictures, along with the 2 least significant bits of each of those pixels. Using this method, the on chip buffer space can be reduced from 5184 bits (2×18×18×8) to 3564 bits (18×18×11), for a 31% improvement in required buffer area.

Figure 1:
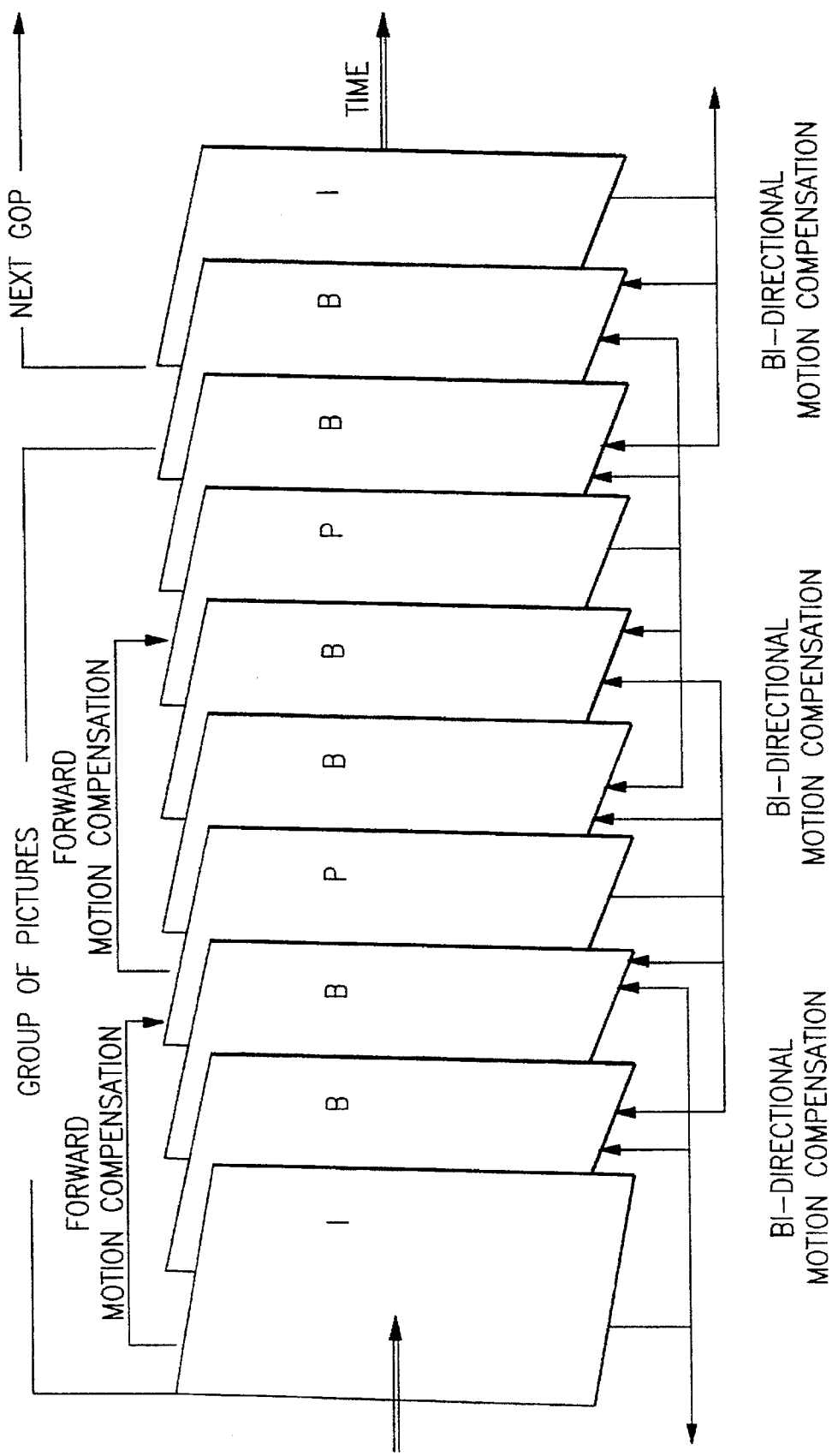
FIG. 1 shows the "I"— Intrapicture Frame, the "P" Predicted Picture frames, and the "B" Bidirectional Frame in a Group of Pictures under the MPEG-2 Standard and is denominated Prior Art and is denominated Prior Art.
Figure 2:
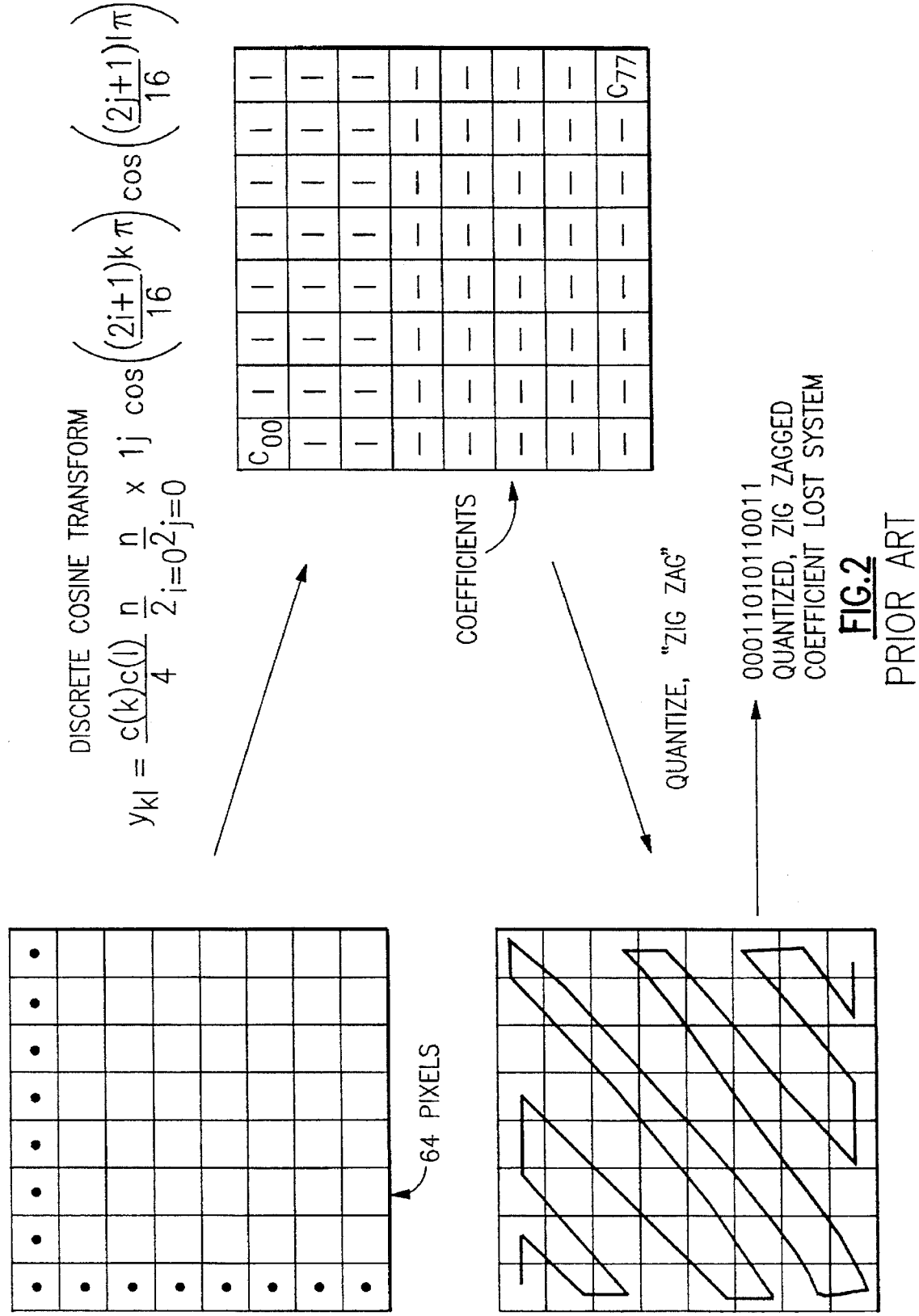
FIG. 2 shows the stages of carrying out the Discrete Cosine Transform spatial compression of the MPEG-2 Standard and is denominated Prior Art.
Figure 3:
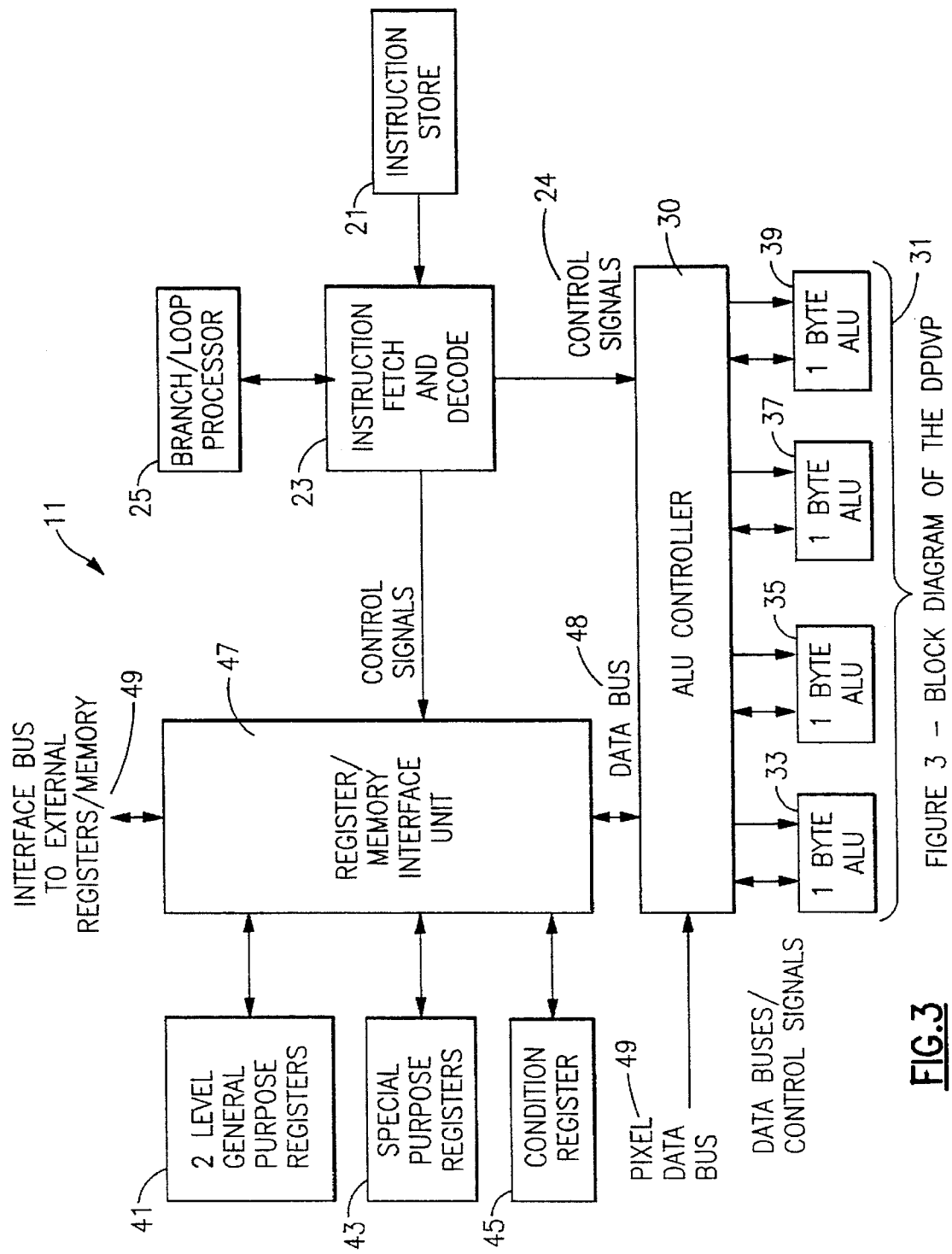
FIG. 3 shows a circuit for calculating horizontal or vertical pixels in B Bidirectionally Interpolated pictures according to the partial sum method of the invention.

Circuitry useful for carrying out the method of the invention is shown in FIG. 3. The circuitry 11 includes an instruction store 21, an instruction fetch and decode unit 23, sending control signals 29 to an ALU controller 30, a branch processor 25, an arithmetic logic unit (ALU) 31, comprised of one byte arithmetic logic units (ALU's) 33, 35, 37, and 39, a two level general purpose register 41, a special purpose register 43, a condition register 45, a register/memory interface unit 47, a data bus 48, and a bus 49 to external registers and memory.

While the invention has been described with respect to certain preferred embodiments and exemplifications, it is not intended to limit the scope of the invention thereby, but solely by the claims appended hereto.

We claim:

1. A method of forming a bidirectionally coded picture from two reference pictures with a single memory fetch of each reference picture and interpolation of the estimated motion of each picture comprising the steps of:

a. identifying a full pixel closest match from three full pixel boundary searches;

b. calculating half pixel reference picture data from said full pixel closest match;

c. storing the half pixel reference picture data in an 18×18×11 bit buffer holding a 7 bit partial sum for each pixel, said partial sum formed by adding the six most significant bits of corresponding I and P frame pixels;

d. interpolating the half pixels to form bidirectionally coded pictures; and e. finding the closest match at the half pixel boundary.

2. The method of claim 1 wherein four bits of each word in the buffer are the two Least Significant Bits of the corresponding I and P frame pixels.

* * * * *